United States Patent
Yoshimi et al.

(10) Patent No.: US 11,525,595 B2
(45) Date of Patent: Dec. 13, 2022

(54) SYSTEM FOR DETERMINING OPERATION CONDITION OF PRECOOLING OPERATION/PREHEATING OPERATION OF AIR CONDITIONER

(71) Applicant: DAIKIN INDUSTRIES, LTD., Osaka (JP)

(72) Inventors: Manabu Yoshimi, Osaka (JP); Tadafumi Nishimura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/439,871

(22) PCT Filed: Mar. 18, 2020

(86) PCT No.: PCT/JP2020/012119
§ 371 (c)(1),
(2) Date: Sep. 16, 2021

(87) PCT Pub. No.: WO2020/189737
PCT Pub. Date: Sep. 24, 2020

(65) Prior Publication Data
US 2022/0090808 A1    Mar. 24, 2022

(30) Foreign Application Priority Data
Mar. 18, 2019  (JP) .............................. JP2019-049520

(51) Int. Cl.
*F24F 11/48* (2018.01)
*F24F 11/46* (2018.01)
(Continued)

(52) U.S. Cl.
CPC .............. *F24F 11/48* (2018.01); *F24F 11/46* (2018.01); *F24F 11/64* (2018.01);
(Continued)

(58) Field of Classification Search
CPC .. F24F 11/48; F24F 11/46; F24F 11/64; F24F 2110/10; F24F 2110/70; F24F 2120/10;
(Continued)

(56) References Cited

U.S. PATENT DOCUMENTS

2013/0066482 A1* 3/2013 Li .......................... H02J 3/144
                                                                       700/297
2015/0136379 A1   5/2015 Takeda et al.
(Continued)

FOREIGN PATENT DOCUMENTS

DE   10 2008 029 220 A1   12/2009
EP            2476967 A1    7/2012
(Continued)

OTHER PUBLICATIONS

International Search Report, issued in PCT/JP2020/012119, dated Jun. 9, 2020.
(Continued)

*Primary Examiner* — Thomas C Lee
*Assistant Examiner* — Anzuman Sharmin
(74) *Attorney, Agent, or Firm* — Birch, Stewart, Kolasch & Birch, LLP

(57) ABSTRACT

A precooling operation/preheating operation control apparatus includes: an air conditioner, a ventilation apparatus, and a controller. The air conditioner performs heat exchange between air in a target space for precooling or preheating and a heat medium. The ventilation apparatus replaces part of the air in the target space with outside air that is air outside a building. The controller determines, on the basis of a set temperature of the target space at a designated time and a quantity related to an outside air temperature, operation details of the air conditioner and operation details of the ventilation apparatus during a precooling operation or preheating operation.

12 Claims, 5 Drawing Sheets

(51) Int. Cl.
    *F24F 11/64*     (2018.01)
    *F24F 110/10*     (2018.01)
    *F24F 120/10*     (2018.01)
    *F24F 130/20*     (2018.01)
    *F24F 11/00*     (2018.01)
    *F24F 110/12*     (2018.01)
    *F24F 11/61*     (2018.01)
    *F24F 11/65*     (2018.01)
    *F24F 11/77*     (2018.01)

(52) U.S. Cl.
    CPC ....... *F24F 2110/10* (2018.01); *F24F 2120/10* (2018.01); *F24F 2130/20* (2018.01)

(58) Field of Classification Search
    CPC ........... F24F 2130/20; F24F 2011/0002; F24F 2110/12; F24F 11/0001; F24F 11/61; F24F 11/65; F24F 11/77; Y02B 30/70
    See application file for complete search history.

(56) References Cited

U.S. PATENT DOCUMENTS

| | | |
|---|---|---|
| 2015/0219356 A1 | 8/2015 | Ito et al. |
| 2016/0103111 A1* | 4/2016 | Griffin .................. B60N 2/002 73/25.01 |
| 2016/0223218 A1* | 8/2016 | Barrett ..................... F24F 11/30 |
| 2018/0004172 A1* | 1/2018 | Patel ....................... G05B 15/02 |
| 2019/0086114 A1 | 3/2019 | Nakashima et al. |
| 2019/0101302 A1* | 4/2019 | Rainone ............... F24F 11/0001 |
| 2019/0203965 A1* | 7/2019 | Thibault ................. F24F 11/64 |
| 2019/0353378 A1* | 11/2019 | Ramamurti ............ G05B 15/02 |
| 2020/0240659 A1* | 7/2020 | Maruyama ............... F24F 11/65 |

FOREIGN PATENT DOCUMENTS

| | | |
|---|---|---|
| EP | 3 040 633 A1 | 7/2016 |
| EP | 3 076 092 A1 | 10/2016 |
| EP | 3296654 A1 | 3/2018 |
| JP | 6-213494 A | 8/1994 |
| JP | 8-210689 A | 8/1996 |
| JP | 2953317 B2 | 9/1999 |
| JP | 2007-120088 A | 5/2007 |
| JP | 2013-72568 A | 4/2013 |
| JP | 2014-61798 A | 4/2014 |
| JP | 2016-61487 A | 4/2016 |
| JP | 6270996 B2 | 1/2018 |
| JP | 2018-40510 A | 3/2018 |
| JP | 2018-71853 A | 5/2018 |
| JP | 6328049 B2 | 5/2018 |
| WO | WO 2013/172279 A1 | 11/2013 |
| WO | WO 2015/029177 A1 | 3/2015 |
| WO | WO 2015/079506 A1 | 6/2015 |
| WO | WO 2017/179386 A1 | 10/2017 |
| WO | WO 2018/179400 A1 | 10/2018 |

OTHER PUBLICATIONS

English translation of International Preliminary Report on Patentability and Written Opinion of the International Searching Authority for International Application No. PCT/JP2020/012119, dated Sep. 30, 2021.

Extended European Search Report for European Application No. 20772918.7, dated Mar. 18, 2022.

* cited by examiner

SYSTEM FOR DETERMINING OPERATION CONDITION OF PRECOOLING OPERATION/PREHEATING OPERATION OF AIR CONDITIONER

TECHNICAL FIELD

The present disclosure relates to a system for determining an operation condition of a precooling operation or preheating operation that is performed by an air conditioner and at least one of a ventilation apparatus and a light-blocking apparatus together with the air conditioner.

BACKGROUND ART

Patent Literature 1 (Japanese Patent No. 6270996) discloses absence control for controlling an air conditioner when a user is absent in an air-conditioning-target space. The absence control is performed in order to increase comfortableness when the user is back to the air-conditioning-target space. During the absence control, in order to determine the length of time for operating the air conditioner and the load processing amount of the air conditioner, the length of an absent time, framework performance of a building including the air-conditioning-target space, and an air conditioning load at the start of occupancy are referred to.

SUMMARY OF THE INVENTION

Technical Problem

The above patent literature describes that a ventilation amount is used for control, but does not describe that a ventilation apparatus is actively controlled during the absence control.

Solution to Problem

A precooling operation/preheating operation control apparatus according to a first aspect includes an air conditioner, a ventilation apparatus, a first control unit, a second control unit, and an operation detail determining unit. The air conditioner performs heat exchange between air in a target space for precooling or preheating and a heat medium. The ventilation apparatus replaces part of the air in the target space with outside air that is air outside a building. The first control unit controls the air conditioner. The second control unit controls the ventilation apparatus. The operation detail determining unit determines, on the basis of a set temperature of the target space at a designated time and a quantity related to an outside air temperature, operation details of the air conditioner and operation details of the ventilation apparatus during a precooling operation or preheating operation.

According to this configuration, the ventilation apparatus is controlled during the precooling operation or preheating operation. Thus, the precooling operation or preheating operation is performed more efficiently.

A precooling operation/preheating operation control apparatus according to a second aspect is the precooling operation/preheating operation control apparatus according to the first aspect, in which the operation detail determining unit determines, further on the basis of a room temperature of the target space at the designated time, the operation details of the air conditioner and the operation details of the ventilation apparatus during the precooling operation or preheating operation.

A precooling operation/preheating operation control apparatus according to a third aspect is the precooling operation/preheating operation control apparatus according to the first aspect or second aspect, in which the operation detail determining unit determines, further on the basis of a $CO_2$ concentration in the target space at the designated time, the operation details of the air conditioner and the operation details of the ventilation apparatus during the precooling operation or preheating operation.

A precooling operation/preheating operation control apparatus according to a fourth aspect is the precooling operation/preheating operation control apparatus according to any one of the first to third aspects, in which the operation details of the air conditioner include an operation start time of the air conditioner. The operation details of the ventilation apparatus include an operation start time of the ventilation apparatus.

A precooling operation/preheating operation control apparatus according to a fifth aspect is the precooling operation/preheating operation control apparatus according to the fourth aspect, in which the operation detail determining unit determines the operation start time of the air conditioner and the operation start time of the ventilation apparatus independently of each other.

A precooling operation/preheating operation control apparatus according to a sixth aspect includes an air conditioner, a light blocking apparatus, a first control unit, a second control unit, and an operation detail determining unit. The air conditioner performs heat exchange between air in a target space for precooling or preheating and a heat medium. The light blocking apparatus blocks light incident on the target space from an outside of the building. The first control unit controls the air conditioner. The second control unit controls the light blocking apparatus. The operation detail determining unit determines, on the basis of a set temperature of the target space at a designated time and a quantity related to an outside air temperature, operation details of the air conditioner and operation details of the light blocking apparatus during a precooling operation or preheating operation.

According to this configuration, the light blocking apparatus is controlled during the precooling operation or preheating operation. Thus, the precooling operation or preheating operation is performed more efficiently.

A precooling operation/preheating operation control apparatus according to a seventh aspect is the precooling operation/preheating operation control apparatus according to the sixth aspect, in which the operation detail determining unit determines, further on the basis of a room temperature of the target space at the designated time, the operation details of the air conditioner and the operation details of the light blocking apparatus during the precooling operation or preheating operation.

A precooling operation/preheating operation control apparatus according to an eighth aspect is the precooling operation/preheating operation control apparatus according to the sixth or seventh aspect, in which the operation detail determining unit determines, further on the basis of a quantity related to a solar radiation amount at the designated time, the operation details of the air conditioner and the operation details of the light blocking apparatus during the precooling operation or preheating operation.

A precooling operation/preheating operation control apparatus according to a ninth aspect is the precooling operation/preheating operation control apparatus according to any one of the sixth to eighth aspects, in which the operation details of the air conditioner include an operation start time of the air conditioner. The operation details of the light blocking apparatus include an operation start time of the light blocking apparatus.

A precooling operation/preheating operation control apparatus according to a tenth aspect is the precooling operation/preheating operation control apparatus according to the ninth aspect, in which the operation detail determining unit determines the operation start time of the air conditioner and the operation start time of the light blocking apparatus independently of each other.

A precooling operation/preheating operation control apparatus according to an eleventh aspect is the precooling operation/preheating operation control apparatus according to any one of the sixth to tenth aspects, in which the light blocking apparatus is a curtain or blind that opens and closes electrically.

A precooling operation/preheating operation control apparatus according to a twelfth aspect, in the precooling operation/preheating operation control apparatus according to any one of the sixth to eleventh aspects, further includes a light sensor that checks a state of the light blocking apparatus. The operation detail determining unit determines, on the basis of output of the light sensor, the operation details of the air conditioner and the operation details of the light blocking apparatus during the precooling operation or preheating operation.

A precooling operation/preheating operation control apparatus according to a thirteenth aspect is the precooling operation/preheating operation control apparatus according to any one of the first to fifth aspects, in which the operation detail determining unit determines, by machine learning, the operation details of the air conditioner and the operation details of the ventilation apparatus during the precooling operation or preheating operation.

A precooling operation/preheating operation control apparatus according to a fourteenth aspect is the precooling operation/preheating operation control apparatus according to the thirteenth aspect, in which the machine learning is reinforcement learning. The operation detail determining unit determines, in the reinforcement learning, the operation details of the air conditioner and the operation details of the ventilation apparatus, on the basis of a value function based on a state variable and a reward. The state variable includes an outside air temperature. The reward is determined on the basis of an error between the room temperature and the set temperature, and an electric energy required for the precooling operation or preheating operation.

A precooling operation/preheating operation control apparatus according to a fifteenth aspect is the precooling operation/preheating operation control apparatus according to any one of the sixth to twelfth aspects, in which the operation detail determining unit determines, by machine learning, the operation details of the air conditioner and the operation details of the light blocking apparatus during the precooling operation or preheating operation.

A precooling operation/preheating operation control apparatus according to a sixteenth aspect is the precooling operation/preheating operation control apparatus according to the fifteenth aspect, in which the machine learning is reinforcement learning. The operation detail determining unit determines, in the reinforcement learning, the operation details of the air conditioner and the operation details of the light blocking apparatus, on the basis of a value function based on a state variable and a reward. The state variable includes an outside air temperature. The reward is determined on the basis of an error between the room temperature and the set temperature, and an electric energy required for the precooling operation or preheating operation.

DESCRIPTION OF EMBODIMENTS (1) Overall Configuration

Figure 1:
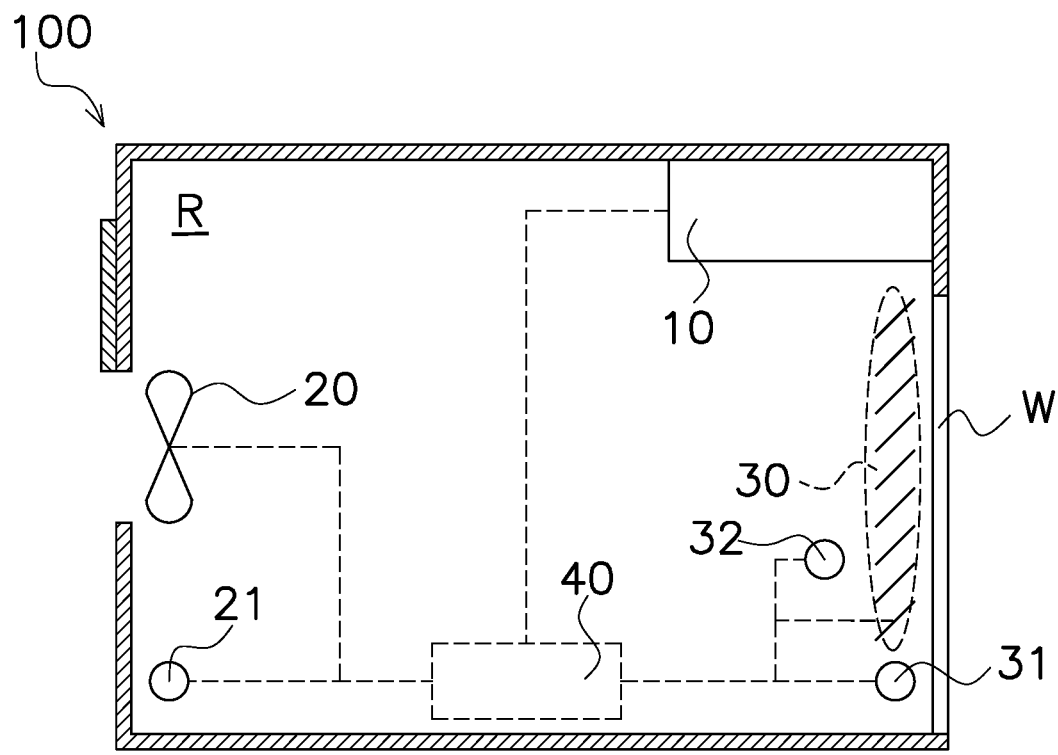
FIG. 1 is a schematic diagram illustrating a precooling operation/preheating operation control apparatus 100.

FIG. 1 illustrates a precooling operation/preheating operation control apparatus 100. The precooling operation/preheating operation control apparatus 100 includes an air conditioner 10, a ventilation apparatus 20, a light blocking apparatus 30, and a control unit 40. The air conditioner 10, the ventilation apparatus 20, and the light blocking apparatus 30 are installed in a room R that is an air conditioning target.

The precooling operation/preheating operation control apparatus 100 can perform absence control. The absence control is control of the air conditioner 10, the ventilation apparatus 20, and the light blocking apparatus 30 performed while a user is absent in an air-conditioning-target space. A cooling operation performed in the absence control is referred to as a precooling operation. A heating operation performed in the absence control is referred to as a preheating operation.

(2) Detailed Configuration (2-1) Air Conditioner 10

Figure 2:
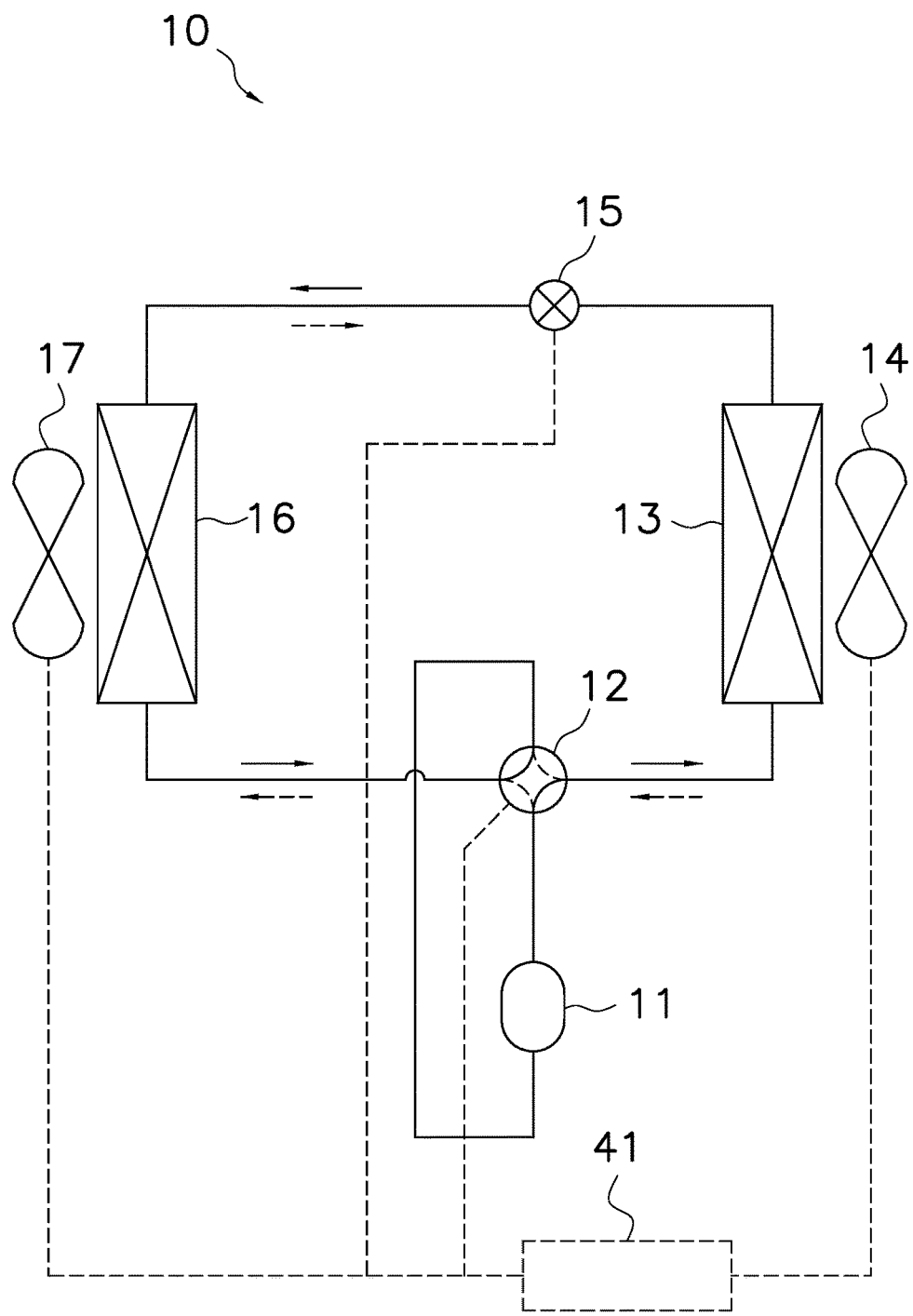
FIG. 2 is a schematic diagram illustrating an air conditioner 10.

The air conditioner 10 conditions air in the room R. FIG. 2 illustrates the configuration of the air conditioner 10. The air conditioner 10 includes a compressor 11, a four-way switching valve 12, an outdoor heat exchanger 13, an outdoor fan 14, an expansion valve 15, an indoor heat exchanger 16, and an indoor fan 17. The air conditioner 10 further includes a temperature sensor, a pressure sensor, and the like, which are not illustrated. In a case of a cooling operation, refrigerant circulates in the direction of the solid arrows. In a case of a heating operation, refrigerant circulates in the direction of the broken arrows.

In the configuration in FIG. 2, the single outdoor heat exchanger 13 and the single indoor heat exchanger 16 are connected. Instead, a configuration in which a plurality of indoor heat exchangers 16 (indoor units) are connected to the single outdoor heat exchanger 13 (outdoor unit) may be employed.

(2-2) Ventilation Apparatus 20

The ventilation apparatus 20 illustrated in FIG. 1 ventilates the room R. The ventilation apparatus 20 is, for example, an electric ventilation fan. Furthermore, a $CO_2$ sensor 21 that measures the CO2 concentration in the room R may be added to the ventilation apparatus 20.

(2-3) Light Blocking Apparatus 30

The light blocking apparatus 30 is installed at a window W of the room R and adjusts the incident degree of solar radiation incident on the room R from the outside of the room R. The light blocking apparatus 30 is, for example, an electric curtain or an electric blind. Furthermore, at least one of a solar radiation sensor 31 for sensing the solar radiation amount and a light sensor 32 for checking the state of the light blocking apparatus may be added to the light blocking apparatus 30.

(2-4) Control Unit 40

Figure 3:
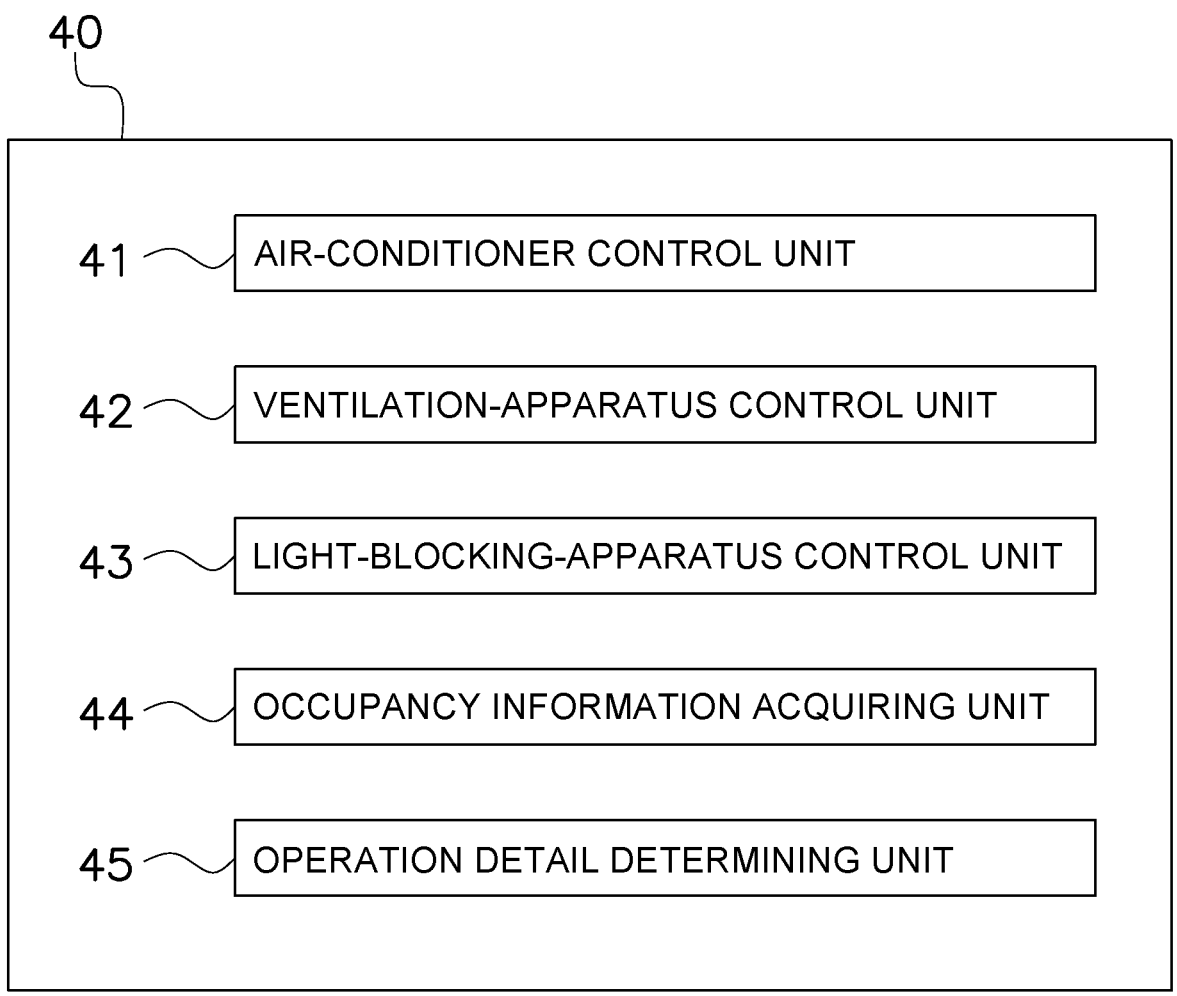
FIG. 3 is a block diagram illustrating a control unit 40.

The control unit 40 controls the air conditioner 10, the ventilation apparatus 20, and the light blocking apparatus 30. The control unit 40 is, for example, a microcomputer. FIG. 3 is a block diagram of the control unit 40. By executing a dedicated program, the control unit 40 functions as an air-conditioner control unit 41, a ventilation-apparatus control unit 42, a light-blocking-apparatus control unit 43, an occupancy information acquiring unit 44, and an operation detail determining unit 45.

The air-conditioner control unit 41 controls the air conditioner 10. Specifically, as illustrated in FIG. 2, the air-conditioner control unit 41 controls the compressor 11, the four-way switching valve 12, the outdoor fan 14, the expansion valve 15, and the indoor fan 17. Furthermore, the air-conditioner control unit 41 acquires temperature information from various temperature sensors that the air conditioner 10 has, which are not illustrated (e.g., room temperature sensor, outside air temperature sensor, discharge-side temperature sensor of the compressor 11, suction-side temperature sensor of the compressor 11, outdoor-heat-exchanger temperature sensor, and indoor-heat-exchanger temperature sensor). Furthermore, the air-conditioner control unit 41 stores a set temperature that is input by a user. Furthermore, the air-conditioner control unit 41 obtains power consumption of the air conditioner 10.

The ventilation-apparatus control unit 42 illustrated in FIG. 3 controls the ventilation apparatus 20. Furthermore, the ventilation-apparatus control unit 42 acquires information on the CO2 concentration from the CO2 sensor 21. Furthermore, the ventilation-apparatus control unit 42 obtains power consumption of the ventilation apparatus 20.

The light-blocking-apparatus control unit 43 controls the light blocking apparatus 30. Furthermore, the light-blocking-apparatus control unit 43 acquires information on the solar radiation amount from the solar radiation sensor 31 and acquires information about a light blocking state from the light sensor 32. Furthermore, the light-blocking-apparatus control unit 43 obtains power consumption of the light blocking apparatus 30.

The occupancy information acquiring unit 44 acquires information about the time a user goes out of the room R and the time the user is back to the room R on the basis of, for example, statistical results of output of a motion sensor. Alternatively, the occupancy information acquiring unit 44 may receive, by manual input, the information about the time a user goes out of the room R and the time the user is back to the room R.

The operation detail determining unit 45 synthetically determines how to operate each of the air conditioner 10, the ventilation apparatus 20, and the light blocking apparatus 30 during a precooling operation or preheating operation to be performed.

(3) Details of Operation Detail Determining Unit 45

(3-1) Configuration

Figure 4:
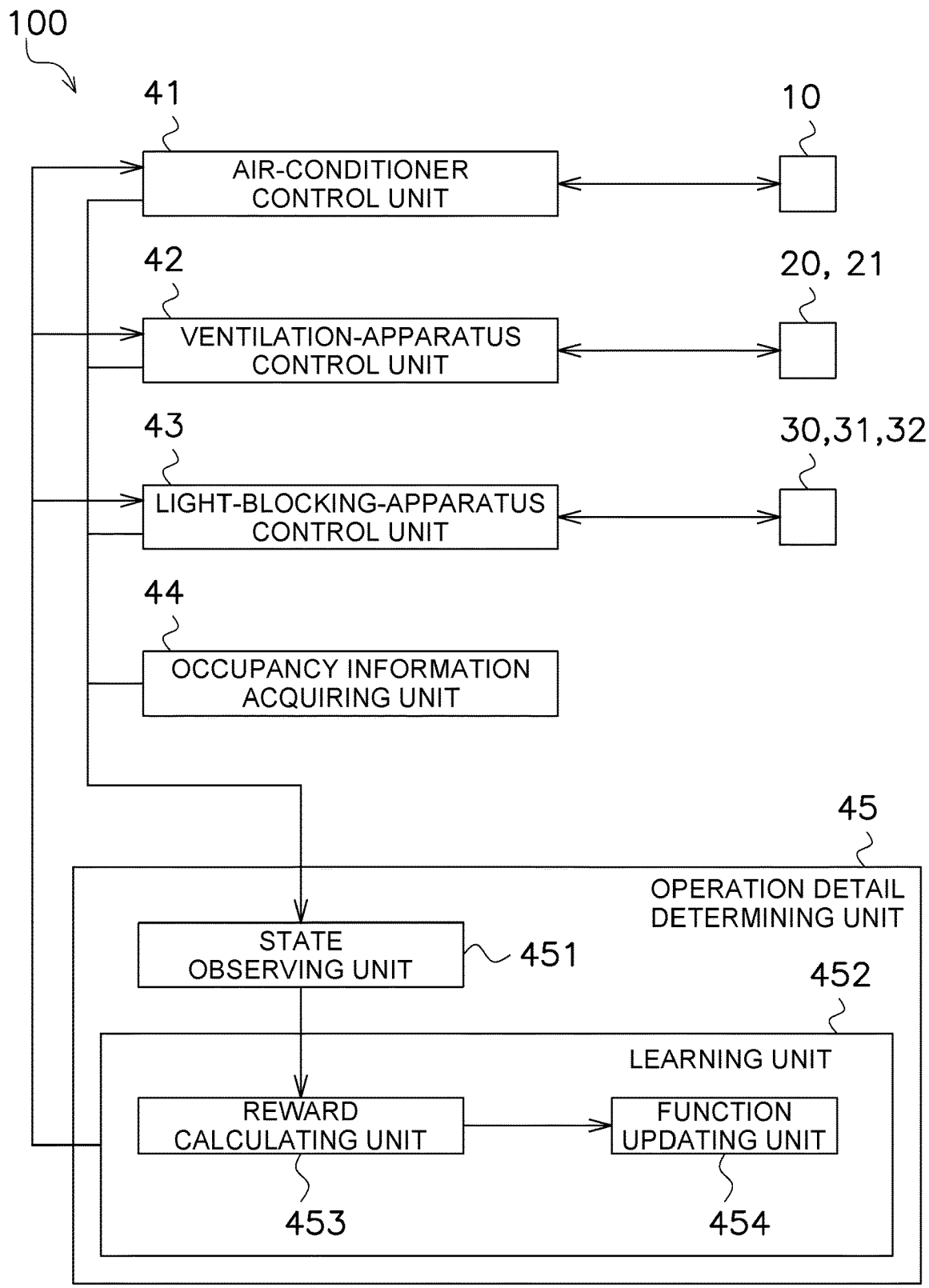
FIG. 4 is a block diagram illustrating the precooling operation/preheating operation control apparatus 100.

FIG. 4 is a block diagram of the precooling operation/preheating operation control apparatus 100. The operation detail determining unit 45 includes a state observing unit 451 and a learning unit 452.

The state observing unit 451 acquires, as state variables, output of various temperature sensors of the air conditioner 10, output of the solar radiation sensor 31 and the light sensor 32, output of the occupancy information acquiring unit 44, and other signals.

In accordance with a training data set including the state variables, the learning unit 452 learns how to control a precooling operation or preheating operation. The learning unit 452 includes a reward calculating unit 453 and a function updating unit 454.

The reward calculating unit 453 calculates a reward on the basis of the following values when a precooling operation or preheating operation is performed.

(A) error between the room temperature and the set temperature at the time the user is back to the room R (B) electric energy required for the precooling operation or preheating operation Specifically, the reward calculating unit 453 gives a large reward when "(A) error" is small, and gives a small reward when "(A) error" is large. In addition, the reward calculating unit 453 gives large reward when "(B) electric energy" is small, and gives a small reward when "(B) electric energy" is large.

On the basis of the state variables acquired by the state observing unit 451 and the reward calculated by the reward calculating unit 453, the function updating unit 454 updates a function (action value function) for calculating how to control the precooling operation or preheating operation. The function herein includes numerical values (action value table) expressed in the form of a table.

The learning unit 452 may update the function in real time. Furthermore, the learning unit 452 may compute the state variables acquired from the state observing unit 451 by multilayer neural network for such updating. At this time, the learning unit 452 preferably performs reinforcement learning.

(3-2) Operation Details

The operation detail determining unit 45 determines operation details of the air conditioner 10. Furthermore, the operation detail determining unit 45 determines at least one of operation details of the ventilation apparatus 20 and operation details of the light blocking apparatus 30.

The operation details of the air conditioner 10 herein may include an operation start time of the air conditioner 10. The operation details of the ventilation apparatus 20 may include an operation start time of the ventilation apparatus 20. The operation details of the light blocking apparatus 30 may include an operation start time of the light blocking apparatus 30. Each of the operation start times of the air conditioner 10, the ventilation apparatus 20, and the light blocking apparatus 30 may be determined independently.

(4) Processing

Figure 5:
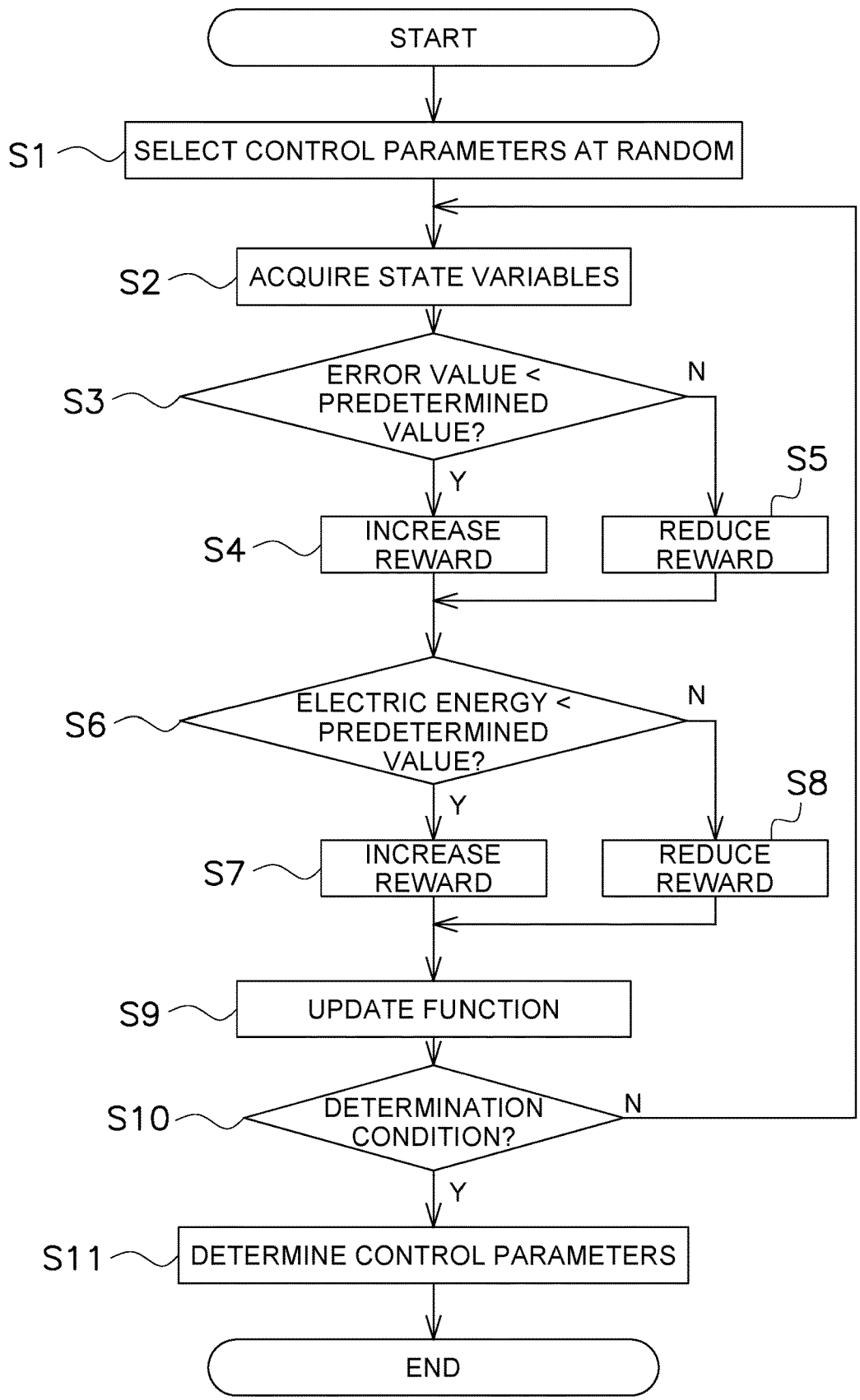
FIG. 5 is a flowchart illustrating processing in the precooling operation/preheating operation control apparatus 100.

FIG. 5 is a flowchart illustrating processing in the precooling operation/preheating operation control apparatus 100. An initial value of "action" in reinforcement learning may be selected at random. In step S1, control parameters for the air conditioner 10, the ventilation apparatus 20, and the light blocking apparatus 30 are selected at random.

In step S2, the state observing unit 451 acquires state variables. Herein, the state variables include output of various temperature sensors of the air conditioner 10, output of the CO2 sensor 21, output of the solar radiation sensor 31 and the light sensor 32, output of the occupancy information acquiring unit 44, and other signals. Specifically, the state variables include the room temperature, the outside air temperature, the intensity of solar radiation, power consumption of the air conditioner 10, the ventilation apparatus 20, and the light blocking apparatus 30 at the time of step S2, the time until the user is back to the room R, and the like.

In step S3, the reward calculating unit 453 determines whether the error value between the room temperature and the set temperature at the time the user is back to the room R is less than a predetermined value when a precooling operation or preheating operation is performed. If it is determined that the error value is less than the predetermined value, in step S4, the reward calculating unit 453 increases the reward. On the other hand, if it is determined that the error value is greater than or equal to the predetermined value, in step S5, the reward calculating unit 453 reduces the reward.

If, in step S6, the reward calculating unit 453 determines that the electric energy required for the precooling operation or preheating operation is less than a predetermined value when the precooling operation or preheating operation is performed, in step S7, the reward calculating unit 453 increases the reward. On the other hand, if it is determined that the electric energy is greater than or equal to the predetermined value, in step S8, the reward calculating unit 453 reduces the reward.

In step S9, on the basis of the state variables and the reward, the function updating unit 454 updates the function for calculating control parameters.

In step S10, it is determined whether a determination condition is satisfied. The determination condition may be input of a command by a user. Alternatively, the determination condition may be an event that a predetermined relational expression is satisfied. If the determination condition is satisfied, the processing advances to step S11. If the determination condition is not satisfied, the process returns to step S2.

In step S11, on the basis of the function, the function updating unit 454 determines control parameters for precooling operation or preheating operation by which a greatest reward is to be obtained.

(5) Characteristics

During the precooling operation or preheating operation, the ventilation apparatus 20 or the light blocking apparatus 30 is controlled. Thus, the precooling operation or preheating operation is performed more efficiently.

(6) Conclusion

Although an embodiment of the present disclosure has been described above, it should be understood that various changes can be made on the forms and details without departing from the spirit and scope of the present disclosure described in the scope of claims.

REFERENCE SIGNS LIST 10 air conditioner
20 ventilation apparatus
21 CO2 sensor
30 light blocking apparatus
31 solar radiation sensor
32 light sensor
40 control unit
41 air-conditioner control unit (first control unit)
42 ventilation-apparatus control unit (second control unit)
43 light-blocking-apparatus control unit (second control unit)
44 occupancy information acquiring unit
45 operation detail determining unit
100 preheating operation control apparatus
451 state observing unit
452 learning unit
453 reward calculating unit
454 function updating unit
R room (target space)

CITATION LIST

Patent Literature

Patent Literature 1: Japanese Patent No. 6270996

The invention claimed is:

1. A precooling operation/preheating operation control apparatus comprising:
an air conditioner that performs heat exchange between air in a target space for precooling or preheating and a heat medium;
a ventilation apparatus that replaces part of the air in the target space with outside air that is air outside a building;
a controller configured to:
control the air conditioner;
control the ventilation apparatus;
acquire a time at which a user is expected to enter the target space, on the basis of statistical results of output of a human detecting sensor; and
determine, on the basis of a set temperature of the target space at a designated time, a quantity related to an outside air temperature, and a time difference between the designated time and the time at which the user is expected to enter the target space, operation details of the air conditioner and operation details of the ventilation apparatus during a precooling operation or preheating operation,
wherein the controller determines, by machine learning, the operation details of the air conditioner and the operation details of the ventilation apparatus during the precooling operation or preheating operation,
wherein the machine learning is reinforcement learning,
wherein the controller determines, in the reinforcement learning, the operation details of the air conditioner and the operation details of the ventilation apparatus, on the basis of a value function based on a state variable and a reward, wherein the state variable includes an outside air temperature, and wherein the reward is determined on the basis of an error value in comparison to a predetermined value, the error value corresponding to a value between a room temperature and a set temperature at a time in which the user returns to the target space, and an electric energy required for the precooling operation or preheating operation.

2. The precooling operation/preheating operation control apparatus according to claim 1, wherein the controller determines, further on the basis of a room temperature of the target space at the designated time, the operation details of the air conditioner and the operation details of the ventilation apparatus during the precooling operation or preheating operation.

3. The precooling operation/preheating operation control apparatus according to claim 1, wherein the controller determines, further on the basis of a $CO_2$ concentration in the target space at the designated time, the operation details of the air conditioner and the operation details of the ventilation apparatus during the precooling operation or preheating operation.

4. The precooling operation/preheating operation control apparatus according to claim 1, wherein the operation details of the air conditioner include an operation start time of the air conditioner, and wherein the operation details of the ventilation apparatus include an operation start time of the ventilation apparatus.

5. The precooling operation/preheating operation control apparatus according to claim 4, wherein the controller determines the operation start time of the air conditioner and the operation start time of the ventilation apparatus independently of each other.

6. A precooling operation/preheating operation control apparatus comprising:

an air conditioner that performs heat exchange between air in a target space for precooling or preheating and a heat medium;

a light blocking apparatus that blocks light incident on the target space from an outside of the building;

a controller configured to:

control the air conditioner;

control the light blocking apparatus;

acquire a time at which a user is expected to enter the target space, on the basis of statistical results of output of a human detecting sensor; and determine, on the basis of a set temperature of the target space at a designated time, a quantity related to an outside air temperature, and a time difference between the designated time and the time at which the user is expected to enter the target space, operation details of the air conditioner and operation details of the light blocking apparatus during a precooling operation or preheating operation, wherein the controller determines, by machine learning, the operation details of the air conditioner and the operation details of the light blocking apparatus during the precooling operation or preheating operation, wherein the machine learning is reinforcement learning, wherein the controller determines, in the reinforcement learning, the operation details of the air conditioner and the operation details of the light blocking apparatus, on the basis of a value function based on a state variable and a reward, wherein the state variable includes an outside air temperature, and wherein the reward is determined on the basis of an error value in comparison to a predetermined value, the error value corresponding to a value between a room temperature and a set temperature at a time in which the user returns to the target space, and an electric energy required for the precooling operation or preheating operation.

7. The precooling operation/preheating operation control apparatus according to claim 6, wherein the controller determines, further on the basis of a room temperature of the target space at the designated time, the operation details of the air conditioner and the operation details of the light blocking apparatus during the precooling operation or preheating operation.

8. The precooling operation/preheating operation control apparatus according to claim 6, wherein the controller determines, further on the basis of a quantity related to a solar radiation amount at the designated time, the operation details of the air conditioner and the operation details of the light blocking apparatus during the precooling operation or preheating operation.

9. The precooling operation/preheating operation control apparatus according to claim 6, wherein the operation details of the air conditioner include an operation start time of the air conditioner, and wherein the operation details of the light blocking apparatus include an operation start time of the light blocking apparatus.

10. The precooling operation/preheating operation control apparatus according to claim 9, wherein the controller determines the operation start time of the air conditioner and the operation start time of the light blocking apparatus independently of each other.

11. The precooling operation/preheating operation control apparatus according to claim 6, wherein the light blocking apparatus is a curtain or blind that opens and closes electrically.

12. The precooling operation/preheating operation control apparatus according to claim 6, further comprising:

a light sensor that checks a state of the light blocking apparatus, wherein the controller determines, further on the basis of output of the light sensor, the operation details of the air conditioner and the operation details of the light blocking apparatus during the precooling operation or preheating operation.

* * * * *